US012468968B2

(12) United States Patent
Li et al.

(10) Patent No.: US 12,468,968 B2
(45) Date of Patent: Nov. 11, 2025

(54) PROVIDER PERFORMANCE SCORING USING SUPERVISED AND UNSUPERVISED LEARNING

(71) Applicant: CLARA ANALYTICS, INC., Santa Clara, CA (US)

(72) Inventors: Ji Li, Mountain View, CA (US); Asha Anju, Santa Clara, CA (US); Xi Chen, San Bruno, CA (US)

(73) Assignee: CLARA ANALYTICS, INC., Santa Clara, CA (US)

( * ) Notice: Subject to any disclaimer, the term of this patent is extended or adjusted under 35 U.S.C. 154(b) by 1163 days.

(21) Appl. No.: 17/186,792

(22) Filed: Feb. 26, 2021

(65) Prior Publication Data

US 2022/0277209 A1   Sep. 1, 2022

(51) Int. Cl.
| G06N 5/045 | (2023.01) |
| G06F 18/214 | (2023.01) |
| G06N 20/20 | (2019.01) |
| G06Q 10/10 | (2023.01) |

(52) U.S. Cl.
CPC .......... *G06N 5/045* (2013.01); *G06F 18/214* (2023.01); *G06N 20/20* (2019.01); *G06Q 10/10* (2013.01)

(58) Field of Classification Search
CPC ...... G06N 5/045; G06N 20/20; G06F 18/214; G06Q 10/10
See application file for complete search history.

(56) References Cited

U.S. PATENT DOCUMENTS

| 5,875,431 A | 2/1999 | Heckman et al. |
| 7,739,128 B2 * | 6/2010 | Farris ................ G06Q 10/10 705/2 |
| 8,219,424 B2 | 7/2012 | Scalet et al. |
| 8,554,603 B1 | 10/2013 | Paulmann |
| 8,805,701 B2 * | 8/2014 | Camacho ............ G16H 40/20 705/2 |

(Continued)

FOREIGN PATENT DOCUMENTS

| CN | 102622375 A | 8/2012 |
| WO | WO 2014/149322 A1 | 9/2014 |

OTHER PUBLICATIONS

PCT International Search Report and Written Opinion, PCT Application No. PCT/US22/11705, Apr. 8, 2022, 13 pages.

(Continued)

*Primary Examiner* — Andrew T Chiusano
(74) *Attorney, Agent, or Firm* — K&L Gates LLP

(57) ABSTRACT

A system and a method are disclosed for a tool that generates a provider score corresponding to a predicted performance of a provider based on data of claims involving the provider. For a given claim, the tool provides the data as input into a supervised machine learning model and receives as output from the supervised machine learning model a predicted performance of the claim. The tool also inputs the data of the claim into an unsupervised machine learning model that is selected based on a stage of claim processing that the claim belongs to and receives as output from the unsupervised machine learning model an identification of a cluster of candidate claims to which the claim belongs. The tool combines the outputs of the supervised machine learning model and the unsupervised machine learning model to generate the provider score.

27 Claims, 9 Drawing Sheets

Supervised & Unsupervised Learning Using Deep (Transfer) Learning and Clustering

(56) References Cited

U.S. PATENT DOCUMENTS

| | | | |
|---|---|---|---|
| 11,238,469 B1* | 2/2022 | Talvola | G06N 20/20 |
| 11,357,582 B1* | 6/2022 | Roh | G10L 13/02 |
| 11,669,907 B1* | 6/2023 | Behrens | H04L 67/10 |
| | | | 705/4 |
| 11,816,539 B1* | 11/2023 | Granson | G06N 5/01 |
| 2002/0038233 A1 | 3/2002 | Shubov et al. | |
| 2004/0103005 A1 | 5/2004 | Wahlbin et al. | |
| 2005/0240578 A1 | 10/2005 | Biederman et al. | |
| 2006/0190490 A1 | 8/2006 | Ritchey et al. | |
| 2007/0192130 A1 | 8/2007 | Sandhu | |
| 2009/0307237 A1 | 12/2009 | Britton et al. | |
| 2012/0303497 A1 | 11/2012 | Derry | |
| 2013/0211989 A1 | 8/2013 | Derry | |
| 2014/0012623 A1 | 1/2014 | Paulmann | |
| 2015/0262318 A1 | 9/2015 | Unwin | |
| 2015/0278972 A1 | 10/2015 | McGuire et al. | |
| 2015/0371348 A1 | 12/2015 | Magrath et al. | |
| 2016/0267396 A1 | 9/2016 | Gray et al. | |
| 2016/0321716 A1 | 11/2016 | Ravikant et al. | |
| 2017/0148118 A1 | 5/2017 | Fuller et al. | |
| 2018/0300640 A1* | 10/2018 | Birnbaum | G06N 5/046 |
| 2019/0156037 A1* | 5/2019 | Gronat | G06N 5/048 |
| 2020/0175625 A1* | 6/2020 | Jia | G06Q 30/0282 |
| 2020/0251205 A1 | 8/2020 | Li et al. | |
| 2021/0365831 A1* | 11/2021 | Li | G06F 18/254 |
| 2022/0147865 A1* | 5/2022 | Naidoo | G06N 3/09 |
| 2024/0153620 A1* | 5/2024 | Stein | G16H 10/60 |

OTHER PUBLICATIONS

Colley, W.N., "Colley's Bias Free College Football Ranking Method: The Colley Matrix Explained," Princeton University, Apr. 5, 2003, pp. 1-23.

PCT International Search Report and Written Opinion, PCT Application No. PCT/US2019/063435, Feb. 3, 2020, 17 pages.

* cited by examiner

PROVIDER PERFORMANCE SCORING USING SUPERVISED AND UNSUPERVISED LEARNING

TECHNICAL FIELD

The disclosure generally relates to the field of machine learning, and more particularly relates to using supervised and unsupervised machine learning models to determine a performance score of a provider.

BACKGROUND

To recommend high quality providers to injured persons, insurance companies may use claim information from claims that a provider has previously handled to determine how the provider historically performed. However, each claim is unique to the claimant, type of injury, insurance coverage, and other factors, and accordingly, each claim is associated with a unique set of data including claim data, medical records, bill information, adjustor notes, and other types of information. Given the great deal of variability in types of data available and the large volume of claim data managed by insurance companies, implementing an automated system for comparing claims and determining how a provider performed is time consuming and involves a substantial amount of computational resources. Further, a single claim often involve dozens of providers, and it is difficult to implement the automated system to sort through the claim data and isolate information that is relevant to determining how individual providers performed.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
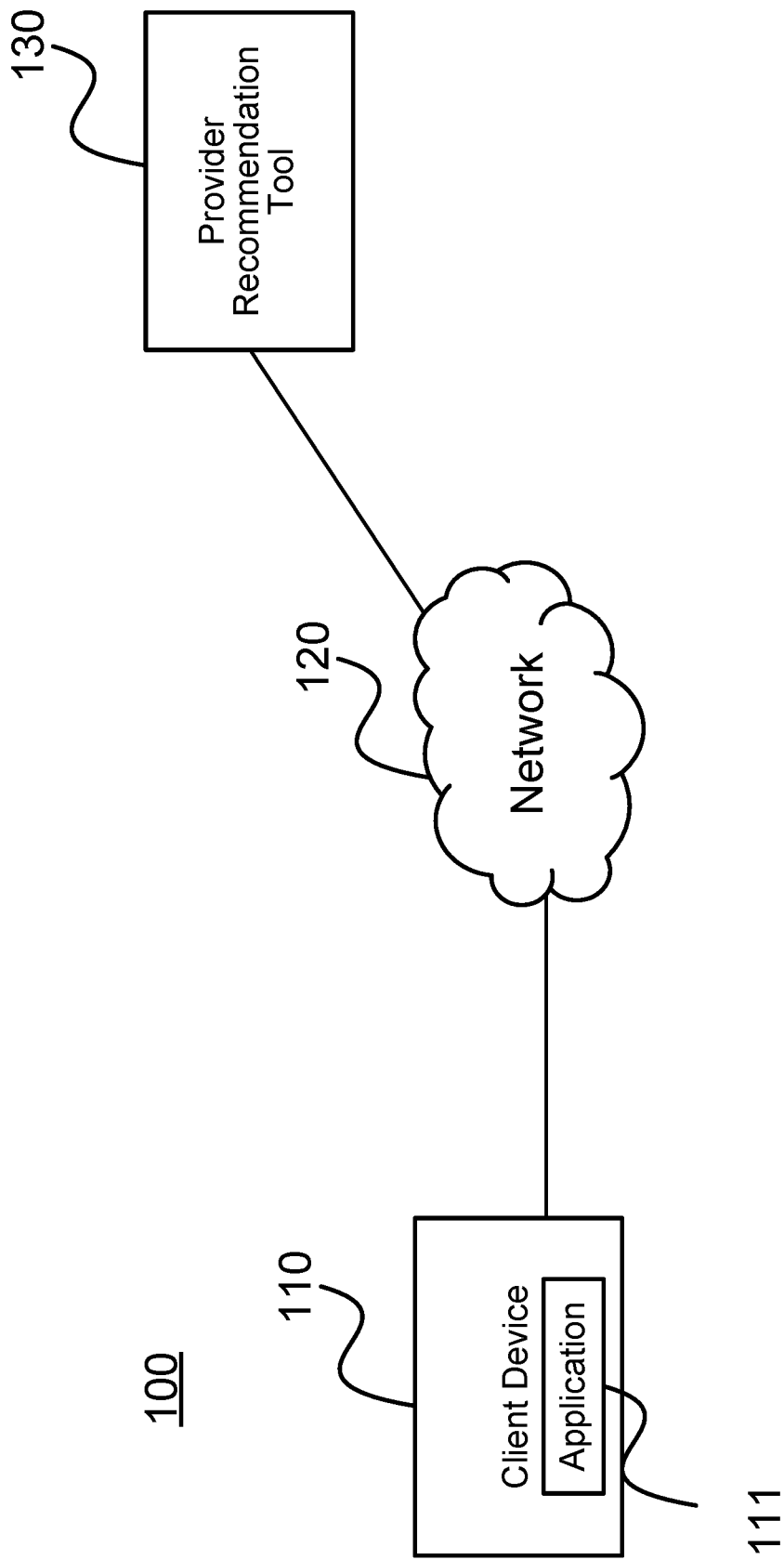
FIG. 1 illustrates a system environment including a provider recommendation tool, according to an embodiment.

The figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method, and computer readable storage medium includes predicting a performance of a provider using a combination of supervised and unsupervised machine learning models. The provider may be involved in a plurality of claims. For each claim, claim data associated with the claim is provided as input to a supervised machine learning model that outputs a predicted performance of the claim. In parallel, the claim data is provided as input to an unsupervised machine learning model that identifies a cluster of candidate claims that are similar to the claim. Further, provider data associated with the provider is provided as input to another unsupervised machine model that identifies a cluster of candidate providers that are similar to the provider. The predicted performance of the claims, the clusters of candidate claims, and the clusters of candidate providers are combined to generate a score representing the performance of the provider. The score associated with the provider is presented to a user (e.g., an insurance company) along with an explanation of why the score was assigned to the provider and how the provider performs relative to similar providers.

Claim processing typically involves a plurality of stages, and as a claim progresses through the plurality of stages, additional data becomes available for the claim. For example, when a claim is opened, a provider recommendation tool initially stores an initial set of data associated with the claim. However, as the claim progresses and more providers associated with the claim submit information associated with services provided with respect to the claim, the provider recommendation tool stores additional information associated with the claim. The provider recommendation tool of the disclosed system may select an unsupervised machine learning model from a plurality of unsupervised machine learning models where each of the plurality of unsupervised machine learning models is associated with a different stage of a claim lifecycle. Depending on the types of information associated with a claim, the provider recommendation tool determine which stage of claim processing the claim is in, and selects an unsupervised machine learning model from the plurality of unsupervised machine learning models for identifying a claim cluster that includes candidate claims that are most similar to the claim. That is, for claims that are in earlier stages of claim processing, a less complex unsupervised machine learning model is used to identify the similar claim cluster compared to claims that are in advanced stages of claim processing. Among other benefits, by using less than all data in some unsupervised models, dimensionality of the latent space may be reduced when clustering claims, which reduces processing power required to identify a claim cluster to which the claim belong.

Network Environment for Claim Prediction Tool

FIG. 1 illustrates a system environment including a provider recommendation tool, according to an embodiment. Environment 100 includes a client device 110, with application 111 installed thereon. Client device 110 communications with a provider recommendation tool 130 over a network 120. Here only one client device 110 and provider recommendation tool 130 are illustrated, but there may be multiple instances of each of these entities, and the functionality of provider recommendation tool 130 may be distributed, or replicated, across multiple servers.

Client device 110 is used by an end user, such as an agent of an insurance company, to access the provider recommendation tool 130. Client device 110 may be a computing device such as smartphones with an operating system such as ANDROID® or APPLE® IOS®, tablet computers, laptop computers, desktop computers, electronic stereos in automobiles or other vehicles, or any other type of network-enabled device on which digital content may be listened to or otherwise experienced. Typical client devices include the hardware and software needed to input and output sound (e.g., speakers and microphone) and images, connect to the network 110 (e.g., via Wifi and/or 4G or other wireless telecommunication standards), determine the current geographic location of the client devices 100 (e.g., a Global Positioning System (GPS) unit), and/or detect motion of the client devices 100 (e.g., via motion sensors such as accelerometers and gyroscopes).

Application 111 may be used by the end user to access information from provider recommendation tool 130. For example, predicted performance of a provider (e.g., a doctors, a dentist, an attorney, and other professionals), recommendation of other providers, and other information provided by provider recommendation tool 130 may be accessed by the end user through application 111, such as the interfaces discussed with respect to FIG. 7. Application 111 may be a dedicated application installed on client device 110, or a service provided by claim prediction tool that is accessible by a browser or other means.

Provider recommendation tool 130 determines a predicted performance of a provider. In a non-limiting embodiment used throughout this specification for exemplary purposes, the provider recommendation tool 130 outputs, for a particular provider, a score representing a predicted performance of the provider based on claims handled by the provider. The particular mechanics of provider recommendation tool 130 are disclosed in further detail below with respect to FIGS. 2-4.

Provider Recommendation Tool—Exemplary Modules and Training

Figure 2:
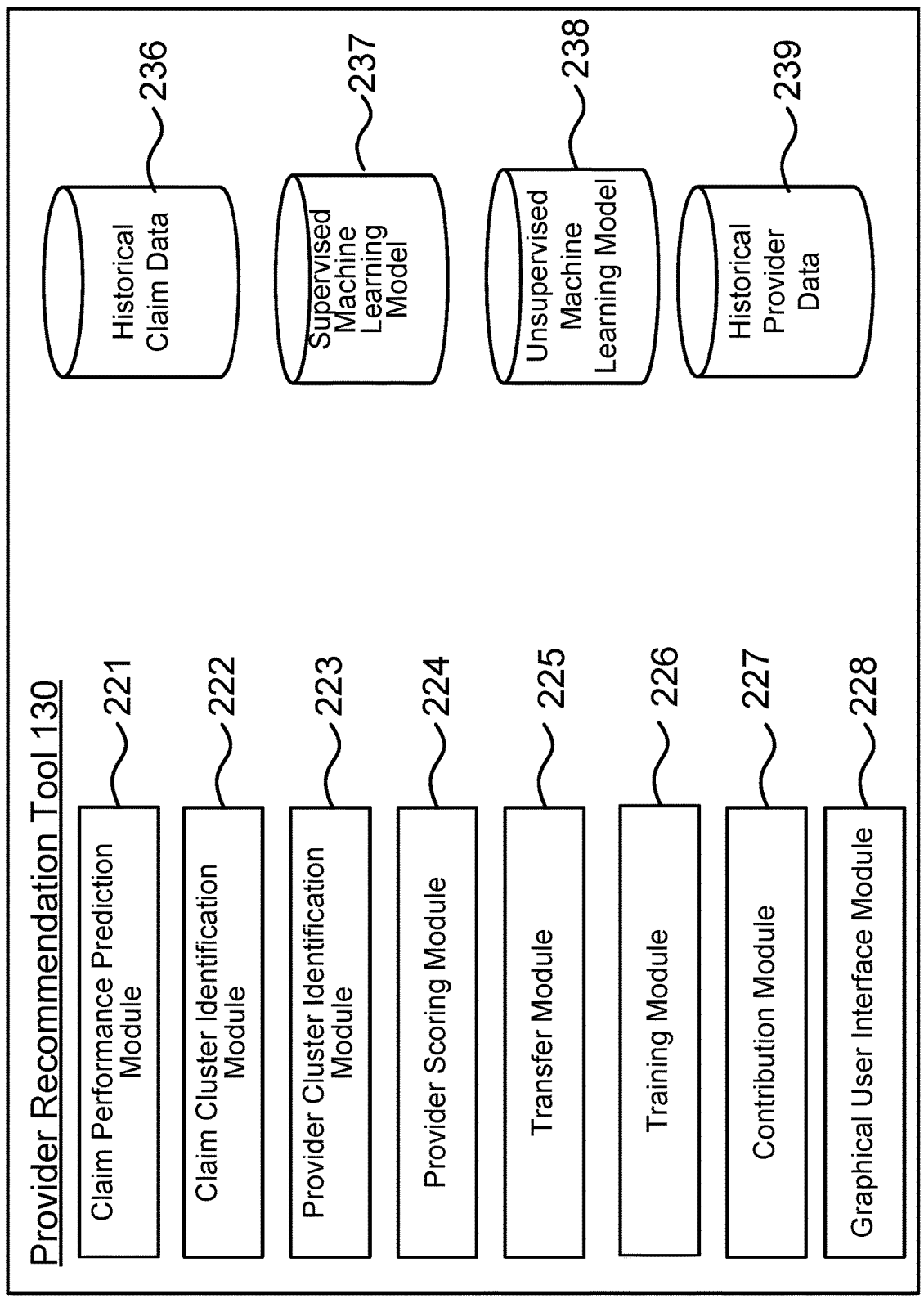
FIG. 2 illustrates modules and databases used by a provider recommendation tool, according to an embodiment.

FIG. 2 illustrates modules and databases used by a provider recommendation tool, according to an embodiment. In one example, an agent of an insurance company searches for a doctor in the provider recommendation tool. The provider recommendation tool 130 retrieves data associated with claims that the doctor has been involved in and applies a supervised machine learning model and one or more unsupervised machine learning models to determine a score that represents the predicted performance of the doctor. The claims may include historical claims that have been completely processed and/or open claims that are currently being processed. The provider recommendation tool 130 evaluates how the doctor performed in handling each of the claims relative to similar providers who handled similar claims and determines the score based on an aggregate of the doctor's performance across the claims that the doctor is associated with. The provider recommendation tool 130 presents the determined score of the doctor provider to the agent with an explanation of how the score was generated.

The provider recommendation tool 130, as depicted, includes a claim performance prediction module 221, a claim cluster identification module 222, a provider cluster identification module 223, a provider scoring module 224, a transfer module 225, a training module 226, a contribution module 227, and a graphical user interface module 228. The provider recommendation tool 130, as depicted, also includes various databases for storing historical claim data 236, supervised machine learning model 237, unsupervised machine learning model 238, and historical provider data 239. The provider recommendation tool 130 may store a plurality of unsupervised machine learning models 238: one or more candidate models that identify a cluster of candidate claims that a claim belongs to and one or more candidate models that identify a cluster of candidate providers that a provider belongs to. The modules and databases depicted in FIG. 2 are merely exemplary; more or fewer modules and/or databases may be used by provider recommendation tool 130 in order to achieve the functionality described herein. Moreover, these modules and/or databases may be located in a single server, or may be distributed across multiple servers. Some functionality of provider recommendation tool 130 may be installed directly on client device 110 as a component of application 111.

The claim performance prediction module 221 predicts a performance of a given claim based on data associated with the claim. The predicted performance may include predictions of one or more metrics for a claim such as total cost, temporary disability (TD) cost, permanent disability (PD), whether attorney is involved, whether procedure compliance is met, whether drug compliance is met, whether a lien is in effect, procedure cost, medical cost, lost days, and the like. In order to predict the performance of the claim, the claim performance prediction module 221 inputs data associated with the claim into the supervised machine learning model 237, and receives as output from supervised machine learning model 237 the predicted performance. The data associated with the claim may be retrieved from the historical claim data 236 database, retrieved from a third party system, received from one or more client devices 110, and/or other sources that manage claim data. The predicted performance represents how the claim should have performed given the parameters described in the data associated with the claim. The data may include claim data, injury type, claim open date, claim close date, geological attributes, bill data, medical records, claimant demographics, and the like that describe characteristics of the claim. The claim performance prediction module 221 determines how the predicted performance compares to one or more of actual total cost, actual TD cost, actual PD, actual attorney involvement, actual procedure compliance, actual drug compliance, actual lien in effect, actual procedure cost, actual medical cost, actual lost days, and the like of the claim. Based on the comparison, the claim performance prediction module 221 determines an intermediate score associated with the claim. In some embodiments, the claim performance prediction module 221 may determine the intermediate score based on a ratio of the difference between a predicted metric (e.g., predicted total cost) and actual metric (e.g., actual total cost) to the predicted metric.

The supervised machine learning model 237 that predicts the performance of the claim may be trained by the training module 225 using training samples of historical data, enterprise-specific data (e.g., an insurance company's own data), or some combination thereof. Training samples include any data relating to historical claims, such as an identifier of the claim, a category or cluster of claim type to which the claim corresponds, a resulting cost of the claim, medical provider information, claimant information, (e.g., age, injury, how long it took claimant to go back to work, etc.), attorney information (e.g., win/loss rate, claimant or insurance attorney, etc.), and so on. In general, to produce the training samples, historical claim data available to the provider recommendation tool 130 is anonymized to protect the privacy of claimants (e.g., by striking personal identifying information from the training samples), thus resulting in a generic model for predicting the outcome of future claims. There are some scenarios where enterprises using the provider recommendation tool 130 may desire a more targeted model that is more specific to the specific types of claims that these enterprises historically process, and thus may wish to supplement the training samples with historical claim data of their own. This supplementing process is referred to herein as a "transfer," and is described in further detail with respect to FIGS. 5-6.

When training the supervised machine learning model 237 to predict performance of a given claim, both structured and unstructured claim data may be parsed. Claims tend to have both of these types of data—for example, pure textual data (e.g., doctor's notes in a medical record file) is unstructured, whereas structured data may include predefined features, such as numerical and/or categorical features describing a claim (e.g., claim relates to "wrist" injury, as selected from a menu of candidate types of injuries, claim involves a type of treatment identified by a treatment code). Structured data tends to have low dimensionality, whereas unstructured claims data tends to have high dimensionality. Combining these two types of data is not possible using existing machine learning models, because existing machine learning models cannot reconcile data having different dimensionality, and thus multiple machine learning models would be required in existing system to process structured and unstructured claim data separately, resulting in a high amount of required processing power. However, the training module 226 integrates training for structured and unstructured claim data into a signal supervised machine learning model 237 to output predicted performance of a claim based on both types of claim data, which reduces processing power usage.

Given the training samples, supervised machine learning model 237 may use deep learning to fit input claim data to predict the performance of the claim based on the claim data associated with the claim. The predicted performance of the claim determined by the claim performance prediction module 221 represents how the claim should have performed based on the input claim data. The claim performance prediction module 221 generates an intermediate score for the claim by determining how much the actual performance of the claim deviates from the predicted performance, and provides the intermediate score associated with the claim to the provider scoring module 224. For a provider associated with a plurality of claims, the claim performance prediction module 221 generates an intermediate score for each of the plurality of claims.

The claim cluster identification module 222 determines a claim cluster to which a claim belongs, in parallel with the claim performance prediction module 221 predicting the performance of the claim. The term claim cluster, as used herein, refers to a grouping of historical claims to which the claim most closely corresponds. In order to determine to which claim cluster the claim corresponds, cluster identification module 224 selects an unsupervised learning model 238 from a plurality of candidate unsupervised learning models 238, inputs the claim data into the selected unsupervised machine learning model 238, and receives an identification of a claim cluster to which the new claim corresponds. Depending on which stage of claim processing the claim is in, the claim cluster identification module 222 selects one of the plurality of unsupervised machine learning models 238 that are associated with clustering claims and inputs data associated with the claim such that the selected unsupervised machine learning model 238 outputs an identification of the cluster of candidate claims that the claim belongs. For claims that are in earlier stages of claim processing (e.g., a claim that has just been opened), there is less claim data compared to claims in later stages (e.g., a claim that has been opened for two years). Therefore, a candidate model for processing the claims in the earlier stages clusters historical claims with reduced dimensionality compared to a candidate model for processing the claims in the later stages. Details on selecting the unsupervised machine learning model 238 is described below with respect to FIG. 3.

Each of the plurality of candidate unsupervised learning models 238 is trained by the training module 226 by performing a clustering algorithm on historical claim data 236. The clustering algorithm groups the historical claim data 236 so that similar claims are grouped together under a common cluster identifier. Depending on the candidate unsupervised learning model 238 and the corresponding stage, the clustering algorithm uses a set of parameters such as the age of a claimant, location of a claimant, a nature of the claimant's injury, a body part injured, date that claim was opened, date that claim was closed, claim data, bill data, procedure data, and so on. For example, a first candidate unsupervised learning model 238 associated with a first stage of claim processing (e.g., when a claim is opened) is trained with a first subset of historical claim data 236 of historical claims that were available when the historical claims were initially opened. A second candidate unsupervised learning model 238 associated with a second stage of claim processing (e.g., determining whether the claim is an indemnity claim or a medical-only claim) is trained with a second subset of historical claim data 236 of historical claims that were available when determining whether the claims were indemnity claims or medical-only claims. The second subset of historical claim data 236 may include different and/or additional information compared to the first subset of historical claim data 236. Similarly, for candidate unsupervised learning models 238 corresponding to subsequent stages, the clustering algorithm may involve greater dimensions of latent space when clustering. The definition of what factors into a similar claim determination for the different stages may be assigned by an administrator; that is, an administrator may weight certain claim parameters, such as a claimant's age, an injured body part, a type of injury, cost, whether a claim is indemnified, etc., more highly or less highly than other parameters. As claim data of claims associated with a provider are input into unsupervised machine learning model 238, those claims are assigned to a closest cluster, and that closest cluster's cluster ID is output by unsupervised machine learning model 238 to the provider scoring module 224.

The provider cluster identification module 223 determines a provider cluster to which a provider belongs, in parallel with the claim performance prediction module 221 and the claim cluster identification module 222. The term provider cluster, as used herein, refers to a grouping of providers that the provider is similar to. The provider cluster identification module 223 uses an unsupervised machine learning model 238 that is configured to output an identification of the cluster of candidate providers that the provider belongs to. The unsupervised machine learning model 238 used by the provider cluster identification module 223 is different from the one or more unsupervised machine learning models 238 that identify which cluster of candidate claims that a claim belongs to. The unsupervised machine learning model 238 for identifying the provider cluster receives data associated with providers in addition to claim data associated with claims that the provider is involved in. The unsupervised machine learning model 238 may use a combination of claim features and provider features to identify the provider cluster similar to the input provider.

The unsupervised machine learning model 238 that identifies the provider cluster is trained by the training module 226 by performing a clustering algorithm on historical claim data 236 and historical provider data 239. In addition to claim parameters, the unsupervised machine learning model 238 may use a type of specialty, a location of practice, a number of years a provider has been in practice, types of services provided, types of patients treated, types of insurance accepted, types of claims handled, and the like. The clustering algorithm clusters the historical claim data 236 and the historical provider data 239 to group similar providers under a common cluster identifier. When the provider recommendation tool 130 receives a request from a client device 110 for a provider score of a specified provider, the provider cluster identification module 223 applies the unsupervised machine learning model 238 to identify a cluster of providers that are similar to the specified provider. The identified provider cluster is provided to the provider scoring module 224 to be used in generating the provider score.

The contribution module 227 receives claim data and determines a relative contribution of a provider to a claim. A claim can involve a plurality of providers that provide different treatments and services, and the contribution module 227 determines the contribution that a particular provider had in the claim. In some embodiments, the contribution module 227 determines procedures that were performed by the provider in the claim and associated values (e.g., cost) of the procedures. The contribution module 227 may compare the procedures and associated values of the provider to all of the procedures performed in the claim and associated values and determine a relative contribution of the provider. The relative contribution of the provider is sent to the provider scoring module 224 and used to generate the provider score.

The provider scoring module 224 receives intermediate scores from the claim performance prediction module 221, similar claim cluster from the claim cluster identification module 222, and similar provider cluster from the provider cluster identification module 223 and generates a score associated with the provider. The provider may be associated with a plurality of claims, and for each claim, the provider scoring module 224 receives the predicted performance and identity of a cluster of similar clusters. The provider scoring module 224 normalizes the performance of the claims that the provider is associated with based on the identified claim clusters and provider clusters. The provider scoring module 224 also receives relative contributions of the provider for the claims that the provider is associated with. The relative contributions are used to offset the influences that intervening providers had on the claims and prevent contributions of the intervening providers from affecting the provider score.

Figure 7:
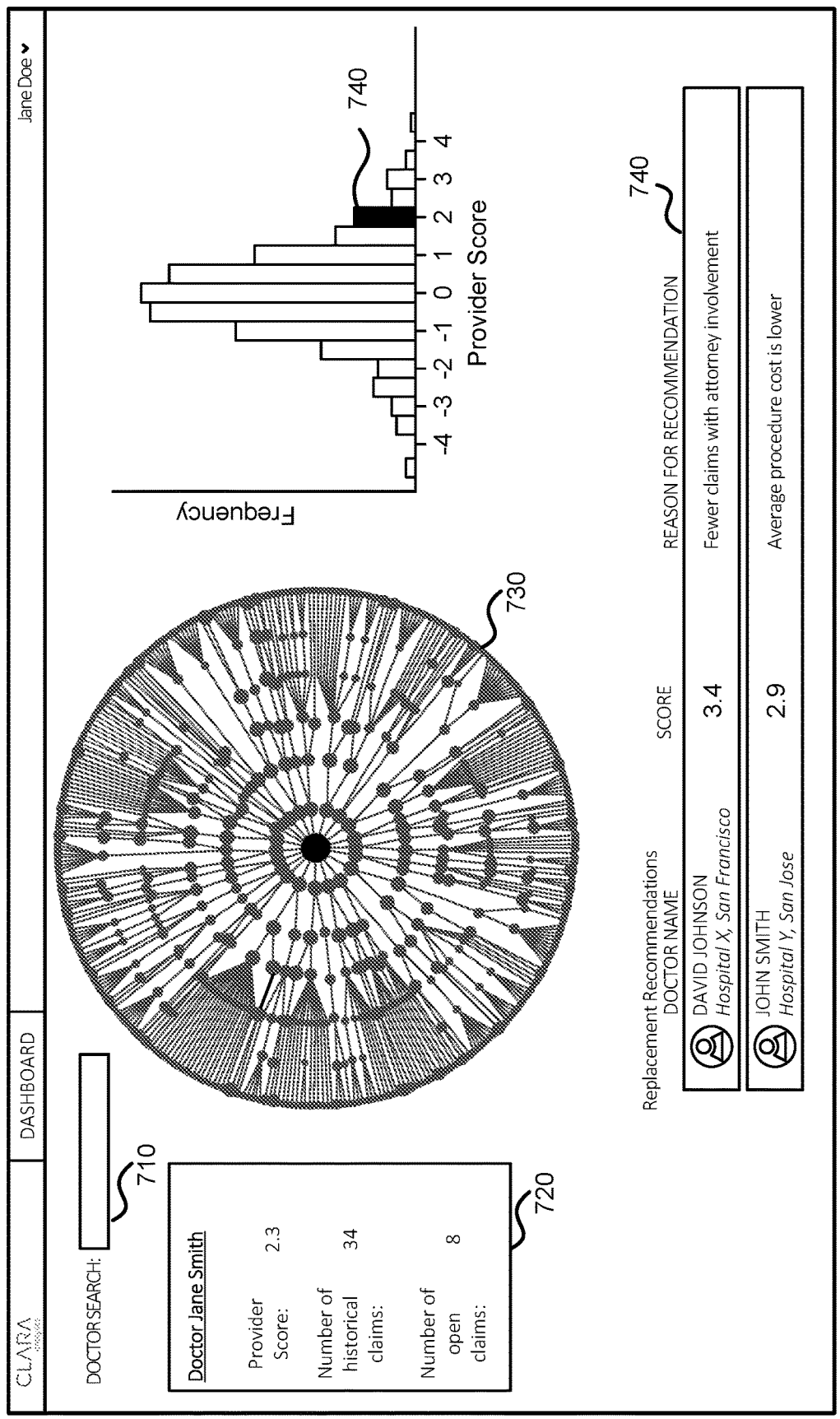
FIG. 7 illustrates an exemplary user interface for presenting a provider performance prediction to a user, according to an embodiment.

The graphical user interface module 228 generates a graphical user interface to present the score associated with the performance of the provider that is presented on the client device 110. In some embodiments, the provider recommendation tool 130 may receive a request via the client device 110 for the performance of a particular provider. For example, a user of the client device 110 may input the name of the provider and request a prediction on the provider's performance. In response to the request, the graphical user interface module 228 generates the graphical user interface that includes the score associated with the provider as well as an explanation of how the score was computed and how the provider performs relative to similar providers. An example of the graphical user interface is illustrated in FIG. 7.

Figure 3:
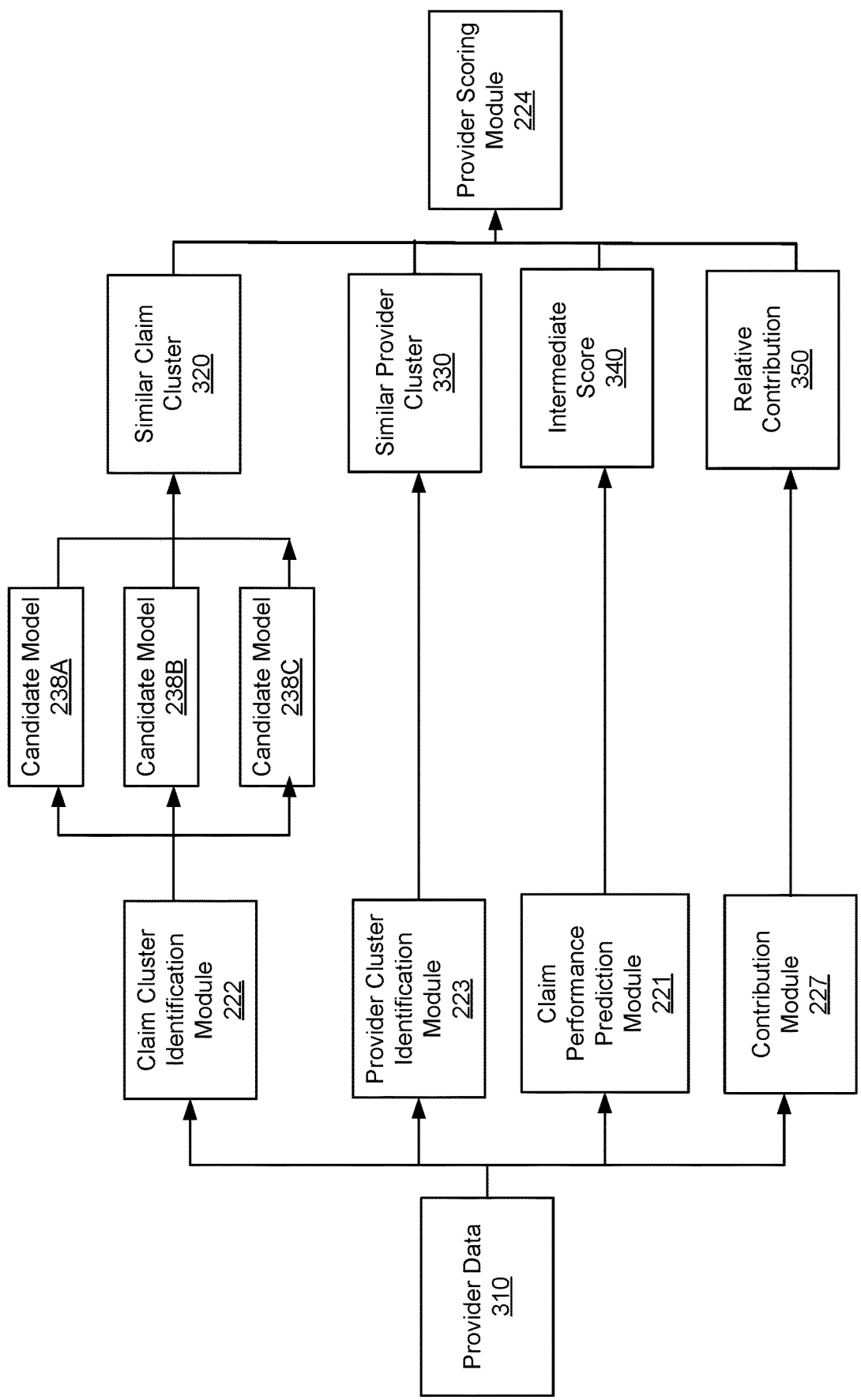
FIG. 3 illustrates an exemplary data flow for scoring a provider, according to an embodiment.

FIG. 3 illustrates an exemplary data flow for scoring a provider, according to an embodiment. When the provider recommendation tool 130 receives a request from a client device 110 to predict provider performance of a particular provider, the provider recommendation tool 130 retrieves provider data 310 associated with the provider. The provider data 310 may include data associated with claims that the provider is involved in and data associated with the provider. The provider data 310 may include historical claim data 236 and historical provider data 239. In some embodiments, the provider data 310 may be managed by an external database and accessed by the provider recommendation tool 130. In some embodiments, at least a subset of the provider data 310 may be provided by the client device 110 via the application 111. The provider recommendation tool 130 provides the provider data 310 to the claim performance prediction module 221, the claim cluster identification module 222, the provider cluster identification module 223, and the contribution module 227, in parallel.

For each claim involving the provider, the associated claim data is provided to the claim cluster identification module 222. Processing a claim can last several years, and as the claim evolves, more claim data becomes available. Thus, claim cluster identification module 222 may select a different candidate unsupervised machine learning mode model 238 depending on which stage the claim is in. For example, the first candidate unsupervised machine learning model 238A (also called "candidate model" herein) 238A is associated with a first stage (e.g., when a claim is initially opened), the second candidate model 238B is associated with a second stage (e.g., determining whether the claim is an indemnity claim or a medical-only claim), and the third candidate model 238C is associated with a third stage (e.g., when bill line data becomes available). If at the time the provider score is being generated, the claim was just opened and belongs to the first stage, the claim cluster identification module 222 selects the first candidate model 238A to determine the similar claim cluster 320. If the provider score is requested again at a later time and the same claim is now in the third stage, the claim cluster identification module 222 selects the third candidate model 238C to determine the similar claim cluster 320. The first candidate model 238A and the third candidate model 238C may identify different claim clusters for the same claim since claim is clustered using different features. In the example illustrated in FIG. 3, the claim cluster identification module 222 selects the third candidate model 238C, and the third candidate model 238C outputs the similar claim cluster 320 to the provider scoring module 224. For each of the remaining claims that the provider is associated with, the claim cluster identification module 222 repeats selecting a candidate model 238 based on the stage that the claim is in and determining the similar claim cluster 320 for the claim.

To select an unsupervised machine learning model 238, the claim cluster identification module 222 may determine whether information available for a claim satisfies data fields associated with a stage. Each stage may be associated with a unique set of data fields, and the claim cluster identification module 222 compares the information available for the claim to the sets of data fields associated with the different stages to determine which stage the claim belongs to. For example, if claim information includes information from initial claim forms associated with stage 1, indemnity related information associated with stage 2, but no bill line data associated with stage 3, the claim cluster identification module 222 may determine that the claim is currently in stage 2.

As the claim enters more advanced stages of claim processing and more information becomes available, more complex unsupervised machine learning models are used to determine the similar claim cluster 320 since more dimensions are considered to identify the similar claims. However, when there is limited claim data in earlier stages, less complex unsupervised machine learning models can be used, which takes less time and uses less resources. By selecting the unsupervised machine learning models depending on the stage instead of using a complex unsupervised machine learning model even when there is limited claim data, the claim cluster identification module 222 can reduce computational resource usage without sacrificing the accuracy of similar claim cluster 320 identification.

In an alternative embodiment, the claim cluster identification module 222 uses the same unsupervised machine learning model 238 for multiple stages of claim processing. Thus, the claim cluster identification module 222 may omit the step of selecting a candidate unsupervised machine learning mode model 238.

The provider data 310 is also provided to the provider cluster identification module 223. The provider cluster identification module 223 is configured to identify a similar provider cluster 330 that the provider belongs to based on the provider data 310. The provider cluster identification module 223 may apply a combination of claim data and provider data to the unsupervised machine learning model 238 configured to identify the similar provider cluster 330. The similar provider cluster 330 is provided to the provider scoring module 224.

For each claim that the provider is associated with, the claim performance prediction module 221 receives claim data associated with the claim and determines the predicted claim performance using the supervised machine learning model 237. The claim performance prediction module 221 determines an intermediate score 340 based on a comparison of the predicted claim performance to the actual claim performance. Similarly, for each claim that the provider is associated with, the contribution module 227 determines a relative contribution 350 that the provider has on the claim compared to intervening providers that are also associated with the claim.

The provider scoring module 224 receives the similar provider cluster 330 for the provider and the similar claim cluster 320, the intermediate score 340, and the relative contribution 350 for each of the claims handled by the provider and generates a score for the provider. The provider score representing the overall performance of the provider in handling claims. To determine the provider score, the provider scoring module 224 may determine a claim score for each of the claims associated with the provider by normalizing the intermediate score 340 of a given claim based on the similar provider cluster 330, similar claim cluster 320, and the relative contribution 350. The provider scoring module 224 may aggregate the claim scores of all of the claims handled by the provider to generate the provider score.

Figure 4:
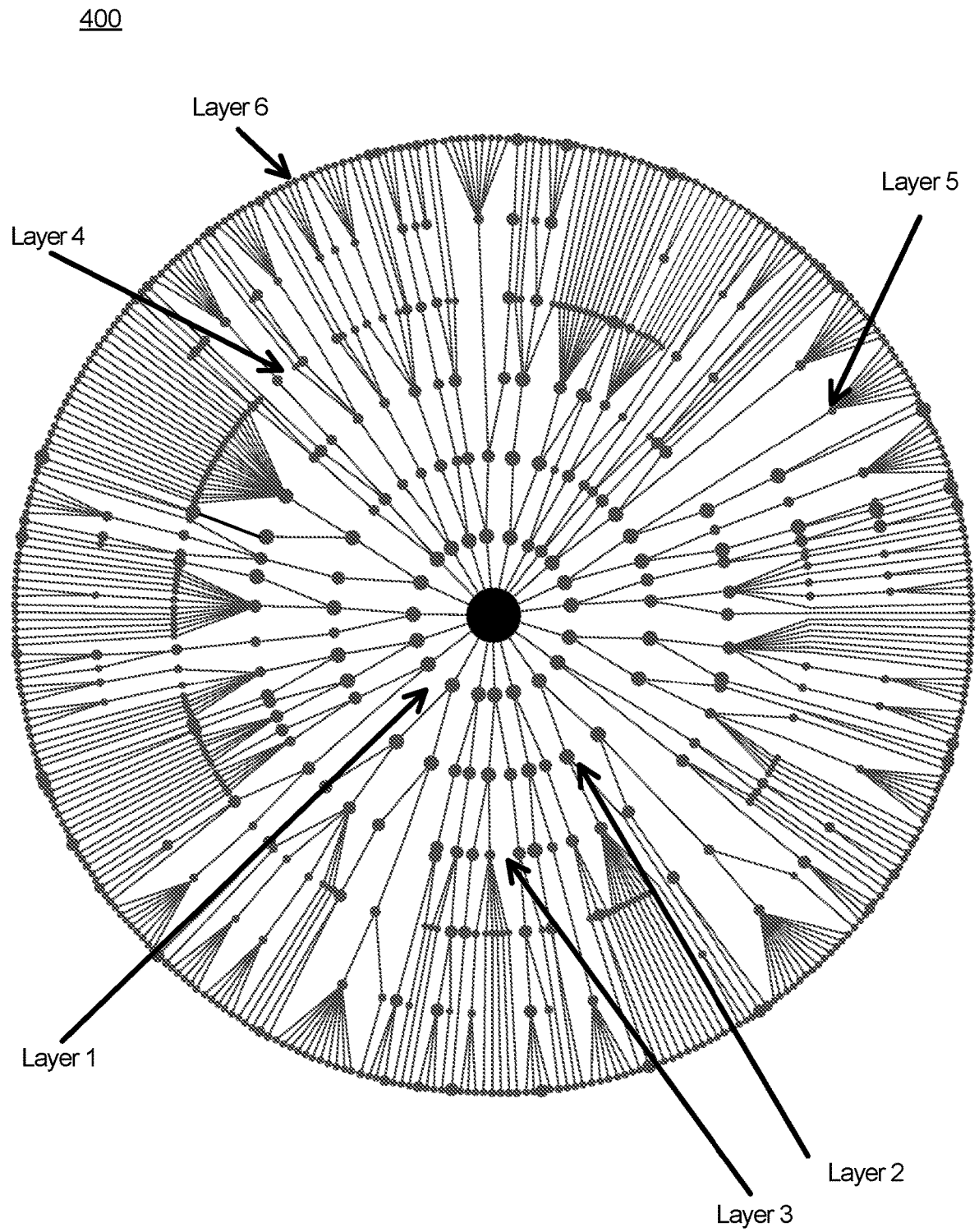
FIG. 4 illustrates an example claim cluster map, according to an embodiment.

FIG. 4 illustrates an example claim cluster map, according to an embodiment. The claim cluster map 400 is a representation of how historical claims are clustered together based on time series data. Processing claims can involve a plurality of stages, and as claims progress through the stages, additional information associated with the claims become available. Therefore, depending on which stage it is in, a claim may be clustered differently.

In the claim cluster map 400, there are six layers: layer 1 through layer 6. Each layer is associated with a stage in claim processing, with layer 1 being associated with the earliest stage and layer 6 being associated with the final stage. In the claim cluster map 400, each node represents a cluster of claims, where the size of the node indicates a number of claims that belong to the cluster. Nodes between layers are connected by lines, and the lines represents how claims are clustered differently as it passes through the different stages. Each stage may be associated with one or more features. For example, layer 1 may be associated with zero day features or features that are available when the claim is initially opened, layer 2 may be associated with indemnity, layer 3 may be associated with bill line data, layer 4 may be associated with injury description and medical procedure description two weeks after the claim was opened, layer 5 may be associated with attorney involvement, and layer 6 may be associated with injury description and medical procedure description two years after the claim was opened. Moving from the center of the cluster map 400 to the outer circle of the cluster map 400, the claims can be clustered with higher dimensionality since there is more available claim data. The claim cluster map 400 depicted in FIG. 4 is merely exemplary and more of fewer layers may be included in the claim cluster map 400 and the layers may be associated with different stages of claim processing to achieve the functionality described herein.

Figure 5:
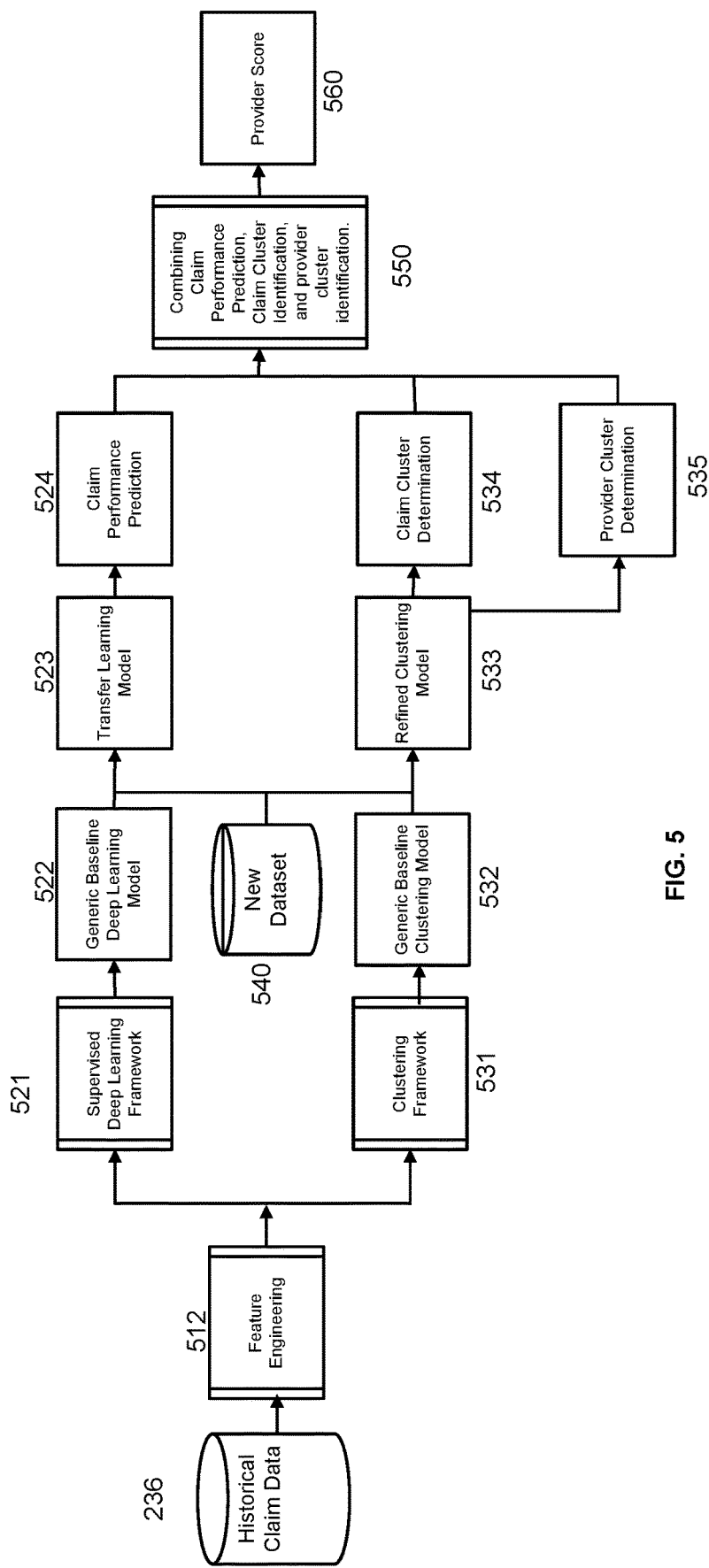
FIG. 5 illustrates an exemplary data flow for transferring enterprise data to generic machine learning models, according to an embodiment.

FIG. 5 illustrates an exemplary data flow for transferring enterprise data to generic machine learning models, according to an embodiment. The data flow begins with historical claim data from the historical claim data 236 being fed to a feature engineering engine 512. The feature engineering engine 512 is optional, and may manipulate the historical claim data in any manner desired, such as by weighting certain parameters, filtering out certain parameters, normalizing claim data, separating structured and unstructured data, and so on. Following feature engineering (if performed), the claim performance prediction module 221 inputs the claim data to supervised deep learning framework 521, which results in generic baseline deep learning model 522. Generic baseline deep learning model 522 is, as described above, a supervised machine learning model now trained to predict performance of a given claim based on the historical claim data.

Where an enterprise wishes to use a more targeted model by supplementing the training samples with claim data of its own, transfer module 225 may supplement the training of generic baseline deep learning model 522 by transferring data of new dataset 540 (which includes the enterprise data) as training data into generic baseline deep learning model 522. Transfer module 225 may perform this supplementing responsive to receiving a request (e.g., detected using an interface of application 111) to supplement the training data with enterprise data. Transfer module 225 may transmit new dataset 540 to transfer learning model 523, which may take as input generic baseline deep learning model 522, as well as new dataset 340, and modify generic baseline deep learning model 522 (e.g., using the same training techniques described with respect to elements 512, 521, and 522) to arrive at a fully trained supervised machine learning model 237. At this point, training is complete (unless and until transfer module 225 detects a request for further transfer of further new datasets 540). When a new claim is then input by the enterprise for determining a predicted performance, a claim performance prediction 524 is output by supervised machine learning model 237. Using transfer module 225 enables new enterprises to achieve accurate results even where they only have a small amount of data, in that the small amount of data can be supplemented by the generic model to be more robust.

FIG. 5 shows the parallel determination of claim performance prediction 524, claim cluster determination 534, and provider cluster determination 535. Feature engineered historical claim data is fed into a clustering algorithm (that is, clustering framework 531), which results in a generic baseline clustering model 332. Optionally, where an enterprise desires a more tailored model, historical claim data from an enterprise (e.g., new dataset 540) is used to refine 533 the clustering model by transfer module 225. Unsupervised machine learning model 238 is now trained. When new claim data is received, it is input into unsupervised machine learning model 238, which outputs 534 a claim cluster determination or a provider cluster determination (e.g., based on use of a nearest neighbor determination algorithm). Having a claim performance prediction, a claim cluster determination, and a provider cluster determination, the provider recommendation tool 130 combines 550 the claim performance prediction and the cluster identification, and generates 560 a provider score.

Figure 6:
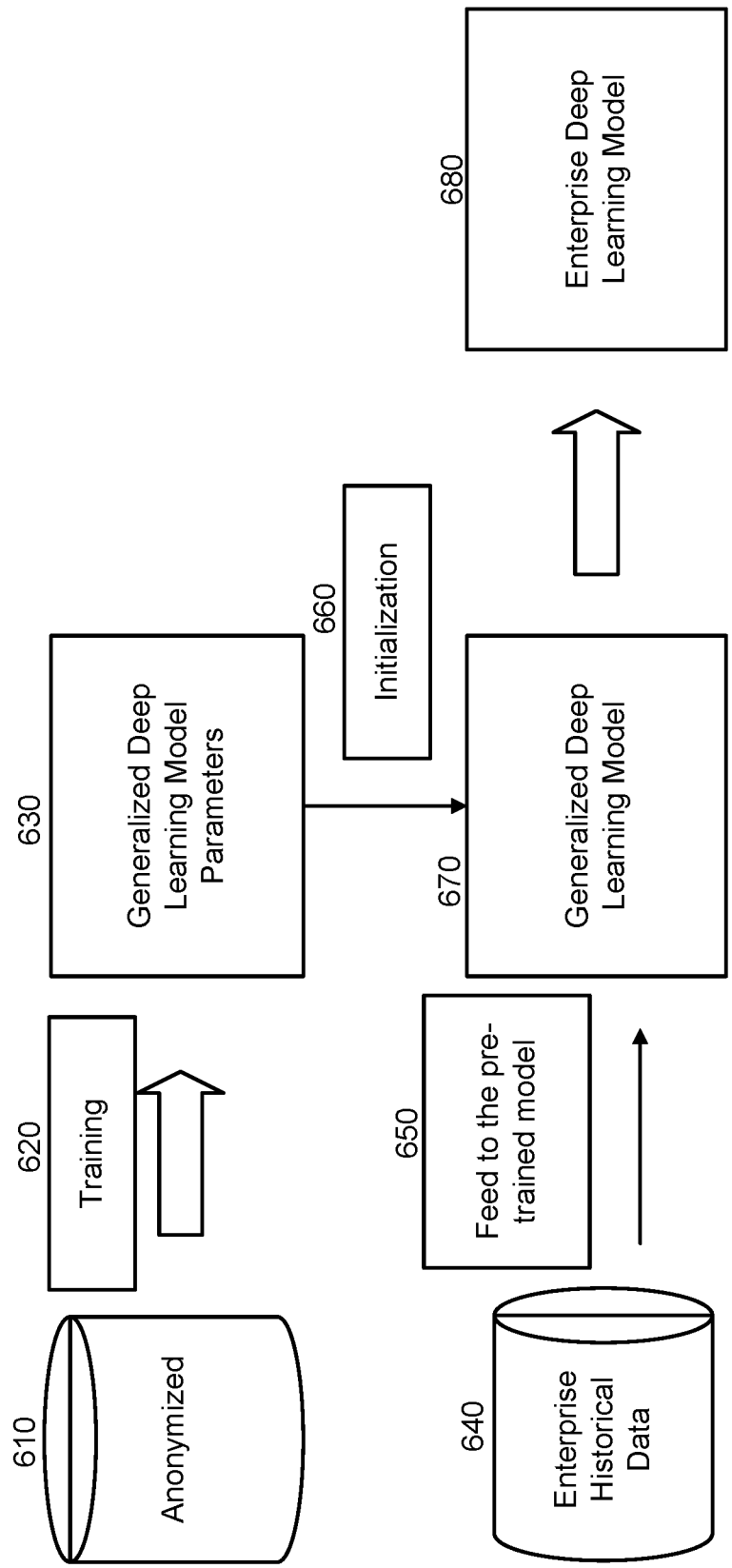
FIG. 6 illustrates another exemplary data flow for transferring enterprise data to a generic machine learning model, according to an embodiment.

FIG. 6 illustrates another exemplary data flow for transferring enterprise data to a generic machine learning model, according to an embodiment. FIG. 6 begins with anonymized data 610 (e.g., as retrieved from historical claim data 236 and discussed with respect to FIG. 5) being used to train 620 a generalized deep learning model 670 to have certain parameters (generalized deep learning model parameters 630). Initialization 660 is performed on the parameters, resulting in generalized deep learning model 670. Meanwhile, enterprise historical data 640 (e.g., corresponding to new dataset 540 as retrieved from an enterprise database) is fed 650 to generalized deep learning model 670. Following training on the enterprise historical data 640, enterprise deep learning model 680, reflecting enterprise-specific training data for fitting new claim data, results in more accurate performance predictions.

FIG. 7 illustrates an exemplary user interface for presenting a provider performance prediction to a user, according to an embodiment. The user interface 700 may be accessed via the application 111 installed on the client device 110. A user may specify a provider in a search bar 710 and request provider performance prediction from the provider recommendation tool 130. The user interface 700 includes information 720 for the specified provider (e.g., Doctor Jane Smith) such as the provider score, number of historical claims that the provider has been involved with, number of open claims that the provider is involved with, and other relevant information. The user interface 700 may also present an interactive cluster map 730 that allows the user to view how claims are clustered. Although not illustrated, claim clusters that include claims handled by the provider may be visually distinguished such that the user may interact with the corresponding node (e.g., clicking on the node). When the user interacts with a node, the user interface 700 may present additional details associated with the claim cluster. The cluster map 730 allows the user to see how claims evolved over time, which can provide valuable information for guiding the navigation of future claims, creating treatment and recovery paths, extracting signals to avoid litigation or other escalations. The user interface 700 may also include a histogram 740 to illustrate how the provider's score compares to scores of similar providers. Methods for scoring and recommending providers is described in U.S. patent application Ser. No. 16/696,915, filed on Nov. 26, 2019, which is hereby incorporated by reference in its entirety. The user interface 700 may additionally recommend one or more other providers 740 that are similar to the searched provider.

Computing Machine Architecture

Figure 8:
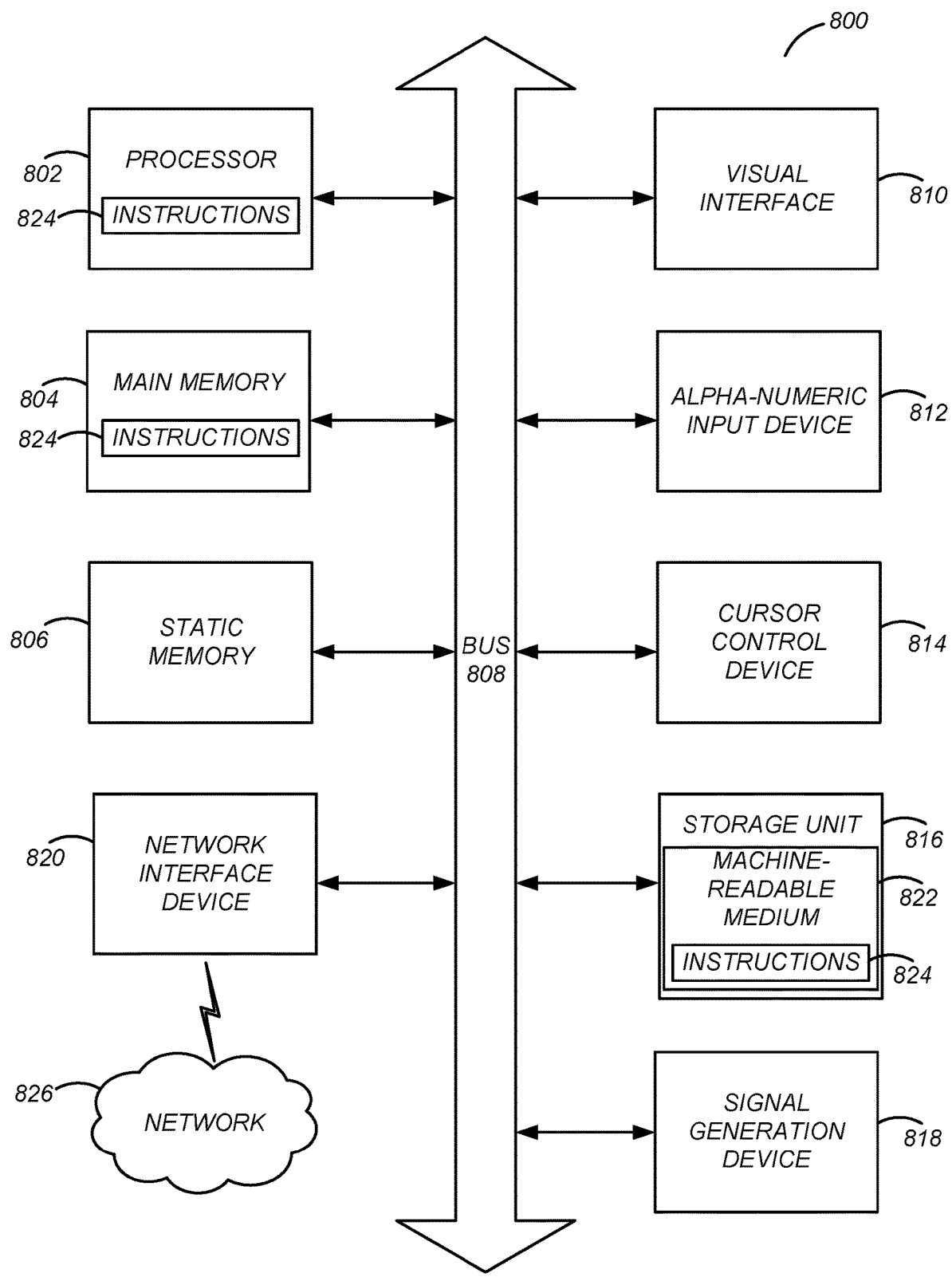
FIG. 8 is a block diagram illustrating components of an example machine able to read instructions from a machine-readable medium and execute them in a processor (or controller), according to an embodiment.

FIG. 8 is a block diagram illustrating components of an example machine able to read instructions from a machine-readable medium and execute them in a processor (or controller). Specifically, FIG. 8 shows a diagrammatic representation of a machine in the example form of a computer system 800 within which program code (e.g., software) for causing the machine to perform any one or more of the methodologies discussed herein may be executed. The program code may be comprised of instructions 824 executable by one or more processors 802. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 800 includes a processor 802 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 804, and a static memory 806, which are configured to communicate with each other via a bus 808. The computer system 800 may further include visual display interface 810. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 810 may include or may interface with a touch enabled screen. The computer system 800 may also include alphanumeric input device 812 (e.g., a keyboard or touch screen keyboard), a cursor control device 814 (e.g., a mouse, a trackball, a joystick, a motion sensor, or other pointing instrument), a storage unit 816, a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. The instructions 824 (e.g., software) may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 (e.g., software) may be transmitted or received over a network 826 via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store instructions (e.g., instructions 824). The term "machine-readable medium" shall also be taken to include any medium that is capable of storing instructions (e.g., instructions 824) for execution by the machine and that cause the machine to perform any one or more of the methodologies disclosed herein. The term "machine-readable medium" includes, but not be limited to, data repositories in the form of solid-state memories, optical media, and magnetic media.

Exemplary Data Flow for Provider Performance Prediction

Figure 9:
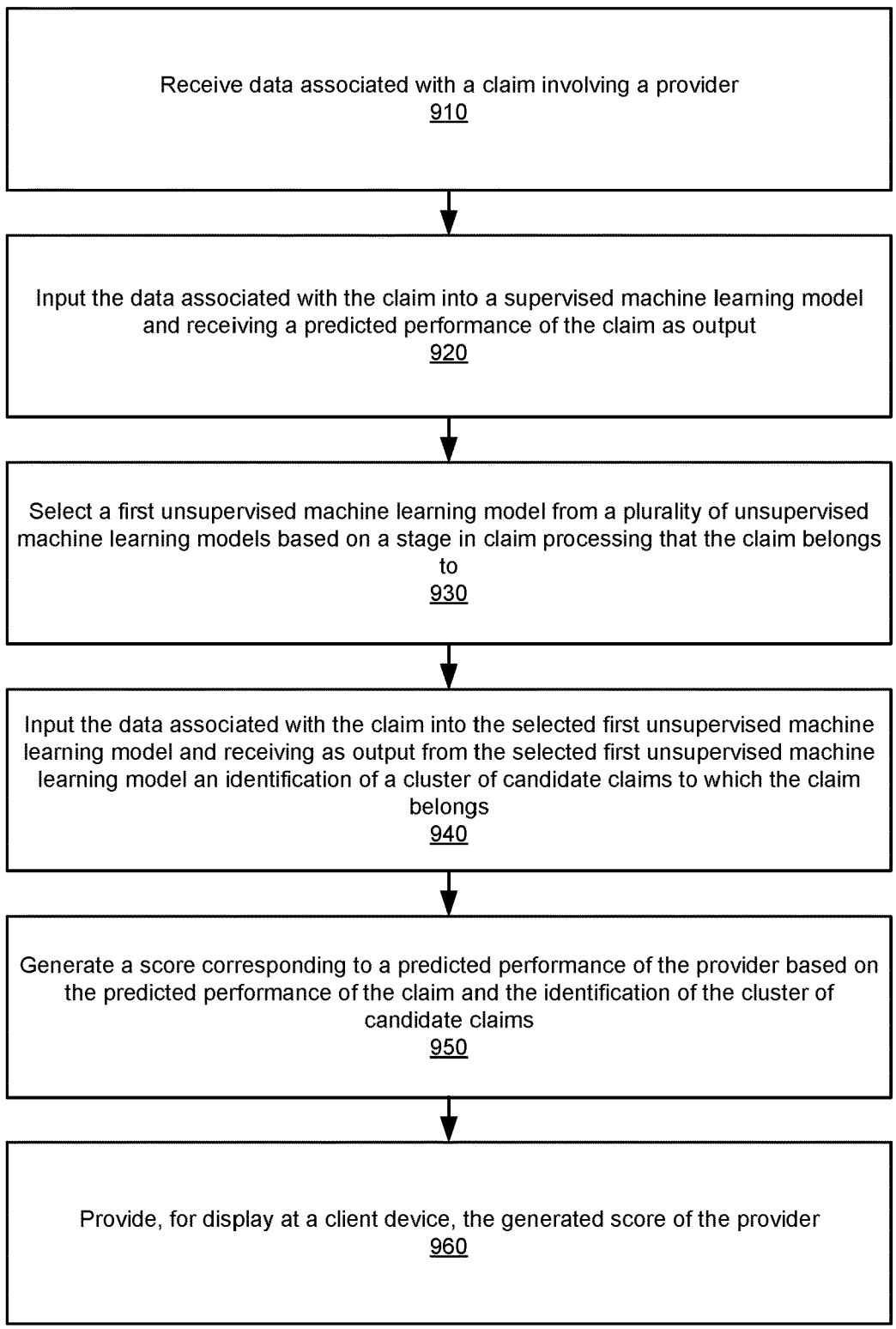
FIG. 9 is an exemplary flow chart depicting a process for predicting a performance of a provider based on supervised and unsupervised machine learning models, according to an embodiment.

FIG. 9 is an exemplary flow chart depicting a process for predicting a performance of a provider based on supervised and unsupervised machine learning models, according to an embodiment. Process 900 begins with the provider recommendation tool 130 (e.g., using processor 802) receiving 910 data associated with a claim involving a provider. The provider recommendation tool 130 inputs 920 the data associated with the claim into a supervised machine learning model (e.g., supervised machine learning model 237) and receiving a predicted performance of the claim as output. The provider recommendation tool 130 selects 930 a first unsupervised machine learning model from a plurality of first unsupervised machine learning models based on a stage in claim processing that the claim belongs to. The provider recommendation tool 130 inputs 940 the data associated with the claim into the selected first unsupervised machine learning model (e.g., in parallel to 920, as depicted in FIG. 3) and receives as output from the selected first unsupervised machine learning model (e.g., unsupervised machine learning model 238) an identification of a cluster of candidate claims to which the claim belongs. Based on the predicted performance of the claim (e.g., output of step 920) and the identification of the cluster of candidate claims (e.g., output of step 940), the provider recommendation tool 130 generates 950 a score corresponding to a predicted performance of the provider. The provider recommendation tool 130 provides 960 the generated score of the provider for display at a client device.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for predicting claim outcomes through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:
1. A method for predicting performance of a provider comprising:

receiving data associated with a claim involving the provider;

inputting the data associated with the claim into a supervised machine learning model and receiving a predicted performance of the claim as output, wherein the supervised machine learning model has been trained on structured data and unstructured data;

selecting a first unsupervised machine learning model from a plurality of unsupervised machine learning models by determining whether information available for the claim satisfies data fields associated with a stage in claim processing that the claim belongs to, one or more of the plurality of unsupervised machine learning models associated with a different stage of a plurality of stages in claim processing, wherein the plurality of stages comprise information associated with the claim as the claim progresses;

inputting the data associated with the claim into the selected first unsupervised machine learning model and receiving as output from the selected first unsupervised machine learning model an identification of a cluster of candidate claims to which the claim belongs;

generating a score corresponding to a predicted performance of the provider based on the predicted performance of the claim and the identification of the cluster of candidate claims; and providing, for display at a client device, the generated score of the provider.

2. The method of claim 1, further comprising:
receiving data associated with the provider; and
inputting the data associated with the provider and the data associated with the claim into a second unsupervised machine learning model from the plurality of unsupervised machine learning models and receiving as output from the second unsupervised machine learning model an identification of a cluster of candidate providers to which the provider belongs.

3. The method of claim 2, wherein generating the score corresponding to the predicted performance of the provider is further based on the identification of the cluster of candidate providers.

4. The method of claim 1, further comprising:
determining a contribution of the provider to the claim relative to other providers associated with the claim.

5. The method of claim 1, wherein the supervised machine learning model is further trained using a set of training data including data associated with historical claims, wherein one or more of the historical claims are associated with an enterprise to which the client device belongs.

6. The method of claim 1, wherein inputting the data associated with the claim into the selected first unsupervised machine learning model further comprises:
identifying a subset of the data associated with the stage in claim processing that the claim belongs to; and
inputting the subset of the data into the selected first unsupervised machine learning model.

7. The method of claim 1, wherein the generated score of the provider is presented relative to candidate providers in a cluster of candidate providers to which the provider belongs.

8. The method of claim 1, further comprising:
receiving additional data associated with the claim involving the provider, the additional data associated with a subsequent stage in claim processing;
responsive to receiving the additional data, selecting a second unsupervised machine learning model from the plurality of unsupervised machine learning models based on the subsequent stage that the claim belongs to;

inputting the additional data associated with the claim into the second unsupervised machine learning model and receiving as output from the second unsupervised machine learning model an identification of another cluster of candidate claims to which the claim belongs;

updating the score corresponding to a predicted performance of the provider based on the predicted performance of the claim and the identification of the other cluster of candidate claims; and providing, for display at a client device, the updated score of the provider.

9. The method of claim 1, wherein training the supervised machine learning model comprises parsing the structured data and unstructured data.

10. The method of claim 1, wherein training the supervised machine learning model comprises reconciling a dimensionality of the structured and a dimensionality of the unstructured data.

11. The method of claim 1, wherein selecting the first unsupervised machine learning model from a plurality of unsupervised machine learning models reduces a latent space associated with the cluster of candidate claims to which the claim belongs.

12. The method of claim 1, wherein the information available for the claim comprises information from initial claim forms, indemnity related information associated, or bill line data, or combinations thereof.

13. A non-transitory computer-readable medium comprising computer program instructions that, when executed by a computer processor, cause the processor to perform operations, the instructions comprising instructions to:
receive data associated with a claim involving a provider;
input the data associated with the claim into a supervised machine learning model and receiving predicted performance of the claim as output, wherein the supervised machine learning model is further trained using a set of training data including data associated with historical claims, wherein one or more of the historical claims are associated with an enterprise to which a client device belongs;

select a first unsupervised machine learning model from a plurality of unsupervised machine learning models by determining whether information available for the claim satisfies data fields associated with a stage in claim processing that the claim belongs to, one or more of the plurality of unsupervised machine learning models associated with a different stage of a plurality of stages in claim processing;

input the data associated with the claim into the selected first unsupervised machine learning model and receiving as output from the selected first unsupervised machine learning model an identification of a cluster of candidate claims to which the claim belongs;

generate a score corresponding to a predicted performance of the provider based on the predicted performance of the claim and the identification of the cluster of candidate claims; and provide, for display at a client device, the generated score of the provider.

14. The non-transitory computer-readable medium of claim 13, wherein the instructions comprise instructions to:
receive data associated with the provider; and
input the data associated with the provider and the data associated with the claim into a second unsupervised machine learning model from the plurality of unsupervised machine learning models and receiving as output from the second unsupervised machine learning model an identification of a cluster of candidate providers to which the provider belongs.

15. The non-transitory computer-readable medium of claim 14, wherein the instructions to generate the score corresponding to the predicted performance of the provider is further based on the identification of the cluster of candidate providers.

16. The non-transitory computer-readable medium of claim 13, wherein instructions comprise instructions to:
  determine a contribution of the provider to the claim relative to other providers associated with the claim.

17. The non-transitory computer-readable medium of claim 13, wherein the instructions to input the data associated with the claim into the selected first unsupervised machine learning model further comprises instructions to:
  identify a subset of the data associated with the stage in claim processing that the claim belongs to; and
  input the subset of the data into the selected first unsupervised machine learning model.

18. The non-transitory computer-readable medium of claim 13, wherein the generated score of the provider is presented relative to candidate providers in a cluster of candidate providers to which the provider belongs.

19. The non-transitory computer-readable medium of claim 13, wherein the instructions comprise instructions to:
  receive additional data associated with the claim involving the provider, the additional data associated with a subsequent stage in claim processing;
  responsive to receiving the additional data, select a second unsupervised machine learning model from the plurality of unsupervised machine learning models based on the subsequent stage that the claim belongs to;
  input the additional data associated with the claim into the second unsupervised machine learning model and receiving as output from the second unsupervised machine learning model an identification of a second cluster of candidate claims to which the claim belongs;
  update the score corresponding to a predicted performance of the provider based on the predicted performance of the claim and the identification of the second cluster of candidate claims; and
  providing, for display at a client device, the updated score of the provider.

20. A system comprising:
  a processor; and
  a non-transitory computer-readable medium comprising computer program instructions that, when executed by a computer processor, cause the processor to perform operations comprising:
    training a supervised machine learning model on structured data and unstructured data;
    receiving data associated with a claim involving a provider;
    inputting the data associated with the claim into the supervised machine learning model and receiving predicted performance of the claim as output;
    selecting a first unsupervised machine learning model from a plurality of unsupervised machine learning models by determining whether information available for the claim satisfies data fields associated with a stage in claim processing that the claim belongs to, one or more of the plurality of unsupervised machine learning models associated with a different stage of a plurality of stages in claim processing, wherein the plurality of stages comprise information submitted by providers associated with the claim as the claim progresses;
    inputting the data associated with the claim into the selected unsupervised machine learning model and receiving as output from the selected first unsupervised machine learning model an identification of a cluster of candidate claims to which the claim belongs;
    generating a score corresponding to a predicted performance of the provider by combining the predicted performance of the claim and the identification of the cluster of candidate claims; and
    providing, for display at a client device, the generated score of the provider.

21. The system of claim 20, wherein the computer program instructions cause the processor to further perform operations comprising:
  receiving data associated with the provider; and
  inputting the data associated with the provider and the data associated with the claim into a second unsupervised machine learning model from the plurality of unsupervised machine learning models and receiving as output from the second unsupervised machine learning model an identification of a cluster of candidate providers to which the provider belongs.

22. The system of claim 20, wherein the computer program instructions cause the processor to further perform operations comprising:
  determining a contribution of the provider to the claim relative to other providers associated with the claim.

23. The system of claim 20, wherein the computer program instructions cause the processor to further perform operations comprising:
  receiving additional data associated with the claim involving the provider, the additional data associated with a subsequent stage in claim processing;
  responsive to receiving the additional data, selecting a second unsupervised machine learning model from the plurality of unsupervised machine learning models based on the subsequent stage that the claim belongs to;
  inputting the additional data associated with the claim into the second unsupervised machine learning model and receiving as output from the second unsupervised machine learning model an identification of second cluster of candidate claims to which the claim belongs;
  updating the score corresponding to a predicted performance of the provider based on the predicted performance of the claim and the identification of the second cluster of candidate claims; and
  providing, for display at a client device, the updated score of the provider.

24. A method for predicting performance of a provider comprising:
  receiving data associated with a claim involving the provider;
  inputting the data associated with the claim into a supervised machine learning model and receiving a predicted performance of the claim as output, wherein the supervised machine learning model has been trained on structured data and unstructured data;
  selecting a first unsupervised machine learning model from a plurality of unsupervised machine learning models, one or more of the plurality of unsupervised machine learning models comprise different types of information associated with the claim as the claim progresses, and wherein selection of the first unsupervised machine learning model is based on a type of information associated with the first unsupervised machine learning model;

inputting the data associated with the claim into the selected first unsupervised machine learning model and receiving as output from the selected first unsupervised machine learning model an identification of a cluster of candidate claims to which the claim belongs;

generating a score corresponding to a predicted performance of the provider based on the predicted performance of the claim and the identification of the cluster of candidate claims; and providing, for display at a client device, the generated score of the provider.

25. The method of claim 24, wherein one or more of the plurality of unsupervised machine learning models comprises a different complexity, and wherein selection of the first unsupervised machine learning model is further based on a complexity of the first unsupervised machine learning model.

26. The method of claim 24, wherein the type of information associated with the first unsupervised machine learning model comprises a type of specialty, a location of practice, a number of years a provider has been in practice, a type of service provided, a type of patient treated, or a type of insurance accepted, a type of claim handled, or combinations thereof.

27. The method of claim 24, wherein the different types of information are weighted based on a stage of claim processing associated with each machine learning model of the plurality of unsupervised machine learning models.

* * * * *